United States Patent
Scott

[19]

[11] Patent Number: 5,953,342

[45] Date of Patent: *Sep. 14, 1999

[54] METHOD FOR DYNAMICALLY PROVIDING END-TO-END CONNECTIONS IN AN ASYNCHRONOUS TRANSFER MODE (ATM) NETWORK

[75] Inventor: James Scott, Acton, Mass.

[73] Assignee: Cabletron Systems, Inc., Rochester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/597,301

[22] Filed: Feb. 6, 1996

[51] Int. Cl.$^6$ .................................................. H04L 12/56

[52] U.S. Cl. .............................................. 370/428; 370/395

[58] Field of Search ...................................... 370/381, 382, 370/384, 387, 388, 389, 391, 392, 395, 396, 400, 406, 407, 408, 412, 428, 429, 351, 352, 355, 356, 357, 397, 399, 468

[56] References Cited

U.S. PATENT DOCUMENTS

| | | | |
|---|---|---|---|
| 5,420,858 | 5/1995 | Marshall et al. | 370/395 |
| 5,440,547 | 8/1995 | Easki et al. | 370/395 |
| 5,457,687 | 10/1995 | Nexman | 370/232 |

*Primary Examiner*—Dang Ton
*Attorney, Agent, or Firm*—Wolf, Greenfield & Sacks, P.C.

[57] ABSTRACT

A method for routing data cells in a computer network having a number of nodes and network resources, each node and network resource having a memory, the memories of the network resources each having routing software, storing a number of node connections in each of the memories of each of the nodes, storing a plurality of network resource connections in each of the memories of each of the network resources, selecting a first node, the first node having data cells to transmit, selecting in the first node a first node connection, transmitting the cells on the first node connection to a first network resource, receiving the cells in the first network resource, selecting in the first network resource a first network resource connection, and transmitting the cells on the first network resource connection.

10 Claims, 3 Drawing Sheets

METHOD FOR DYNAMICALLY PROVIDING END-TO-END CONNECTIONS IN AN ASYNCHRONOUS TRANSFER MODE (ATM) NETWORK

FIELD OF THE INVENTION

This invention relates to data communications, and more particularly to the dynamic creation of end to end connections in Asynchronous Transfer Mode (ATM) networks.

BACKGROUND OF THE INVENTION

In any computer communications network, one may find a large number of source nodes vying for a limited number of resources in order to transfer data to a number of destination nodes. Typically, messages are sent from a source node via a communications line to one or more switches in a network, and then forwarded to a destination node. In addition, destination nodes will respond to messages received from source nodes via a communication line, and this communication results in feedback from the destination node to the source node. As can be appreciated, when any number of source nodes begin transmitting data toward a network comprised of one or more network connections that may be described generally as network resources, each of these nodes would like to obtain a connection as soon as possible so as to begin the transmission of data from a source node through one or more switches and on to a destination node. With Asynchronous Transfer Mode (ATM) networks, it is well known that the creation of connections, known as Switched Virtual Circuits (SVCs), is very slow, and that connections through an individual switch or link may only be created at a rate of ten to fifty per second. As a result, this slow rate is viewed as a limit on ATM's use in large backbone networks where service restoration to a group of end stations could result in the thousands or tens of thousands of connections being requested at the same time.

What is needed is a way to eliminate that slow speed of the creation of SVCs so as to increase the flow of data with an ATM network.

SUMMARY OF THE INVENTION

A method for routing data cells in a computer network is provided including the steps of providing a plurality of nodes, each of the nodes having a memory, providing a plurality of network resources to connect each one of the plurality of nodes, each of the network resources having a memory, each of the memories having a stored routing method, storing a plurality of node connections in each of the node memories of each of the nodes, storing a plurality of network resource connections in each of the memories of each of the network resources, selecting a first node, the first node having a plurality of data cells to transmit, selecting in the first node a first node connection, transmitting the cells on the first node connection to a first network resource, receiving the cells in the first network resource, selecting in the first network resource a first network resource connection, and transmitting the cells on the first network resource connection. With such a method, the overhead of the creation of switched virtual circuits (SVCs) is eliminated.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments, which follow, when read in conjunction with accompanying drawings, wherein:

DESCRIPTION OF THE PREFERRED EMBODIMENT(S)

Figure 1:
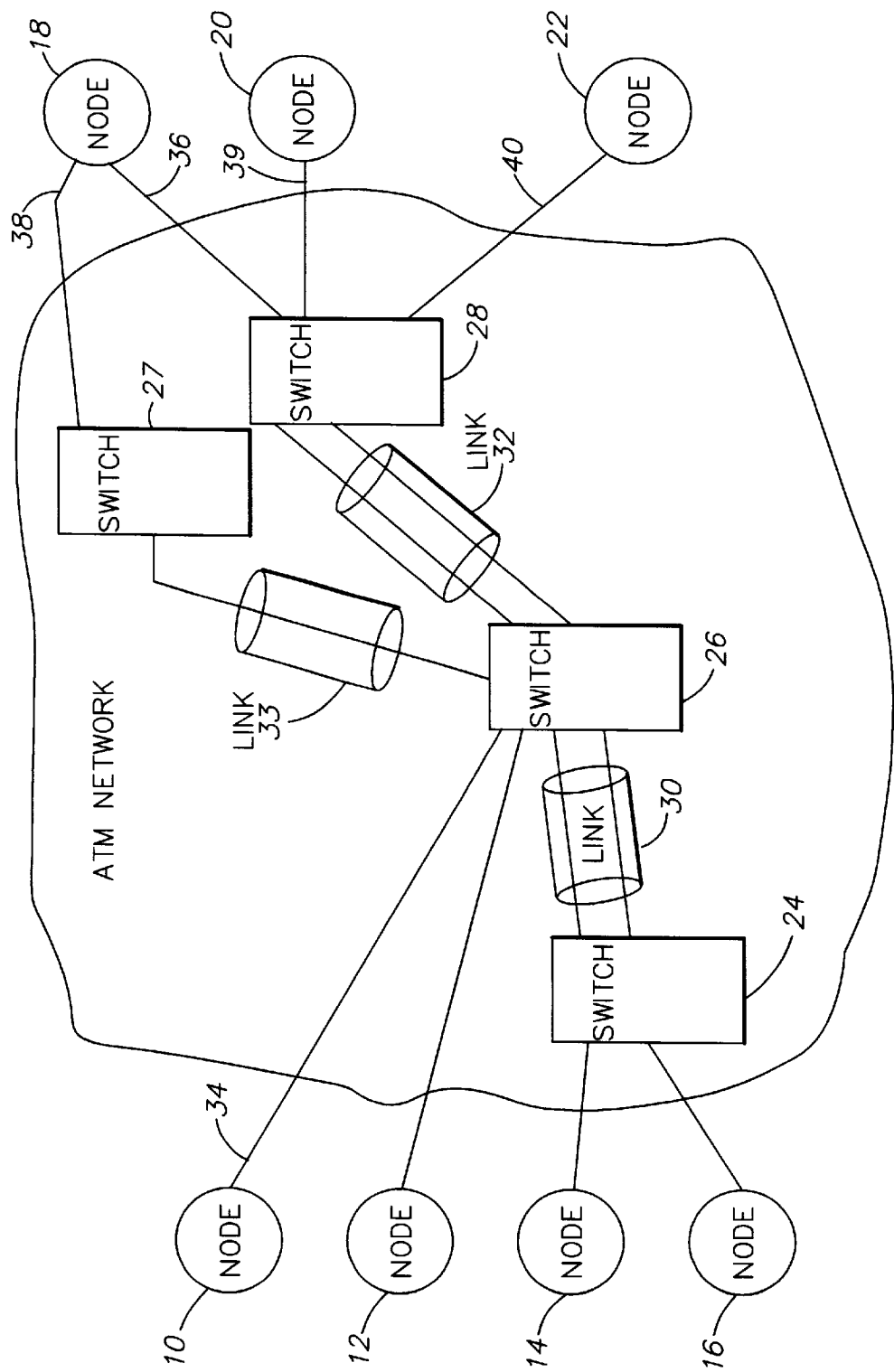
FIG. 1 is a block diagram of an exemplary computer network in which the present invention may be used.

Referring to FIG. 1, an exemplary asynchronous transfer mode (ATM) network is shown to include seven nodes labeled as 10, 12, 14, 16, 18, 20, and 22, respectively. Nodes 10, 12, 14, and 16, may generally be referred to as source nodes, while nodes 18, 20, and 22 may generally be referred to as destination nodes. However, in actual operation, any one node in the exemplary network of FIG. 1 may send data to any one or more of the other nodes in the exemplary network. The exemplary network of FIG. 1 is also shown to include four network resources referred to as switch 24, switch 26, switch 27, and switch 28. The exemplary network also shows a link 30, a link 32, and a link 33.

By way of example, a connection has been established between nodes 10 and 18, respectively. This connection consists of line 34, switch 26, link 32, switch 28, and line 36. Each connection between a source node and a destination node is as referred as a Switched Virtual Circuit (SVC).

As mentioned above, the exemplary SVC contains link 32. Generally, a link provides communication between two ATM devices, either switches or endstations. Specifically, link 32 provides communication between switch 26 and switch 28, while link 30 provides communication between switch 24 and 26.

An exemplary communication from source node 10 to destination node 18 may occur in the following manner according to the prior art. SVCs are established prior to sending any cells via a signaling channel. The SVC is then used to send data cells. The SVC is typically left in place between packets, and only taken down when inactive for several minutes, or in some Local Area Networks (LANs) the SVCs may stay for days or months.

The establishment of the SVC from node 10 to node 18 occurs in the following exemplary manner. Cells arrive at switch 26 from line 34. Switch 26 creates a connection to switch 28 over link 32. Cells arrive at switch 28 where a connection is then created between switch 28 and node 18 via line 36. Thus, the SVC between node 10 and node 18 involved the separate creations of connections by switch 26 and switch 28, each of which typically occurs at a rate of 10–50 per second.

During a second transmission of cells flowing from node 10 to node 18 according to the prior art, switch 26 may establish a connection through link 33 to switch 27. Switch 27 then establishes a connection over line 38 to node 18. Thus, a new SVC has been created between node 10 and node 18, consisting of line 34, switch 26, link 33, switch 27, and line 38.

Figure 2:
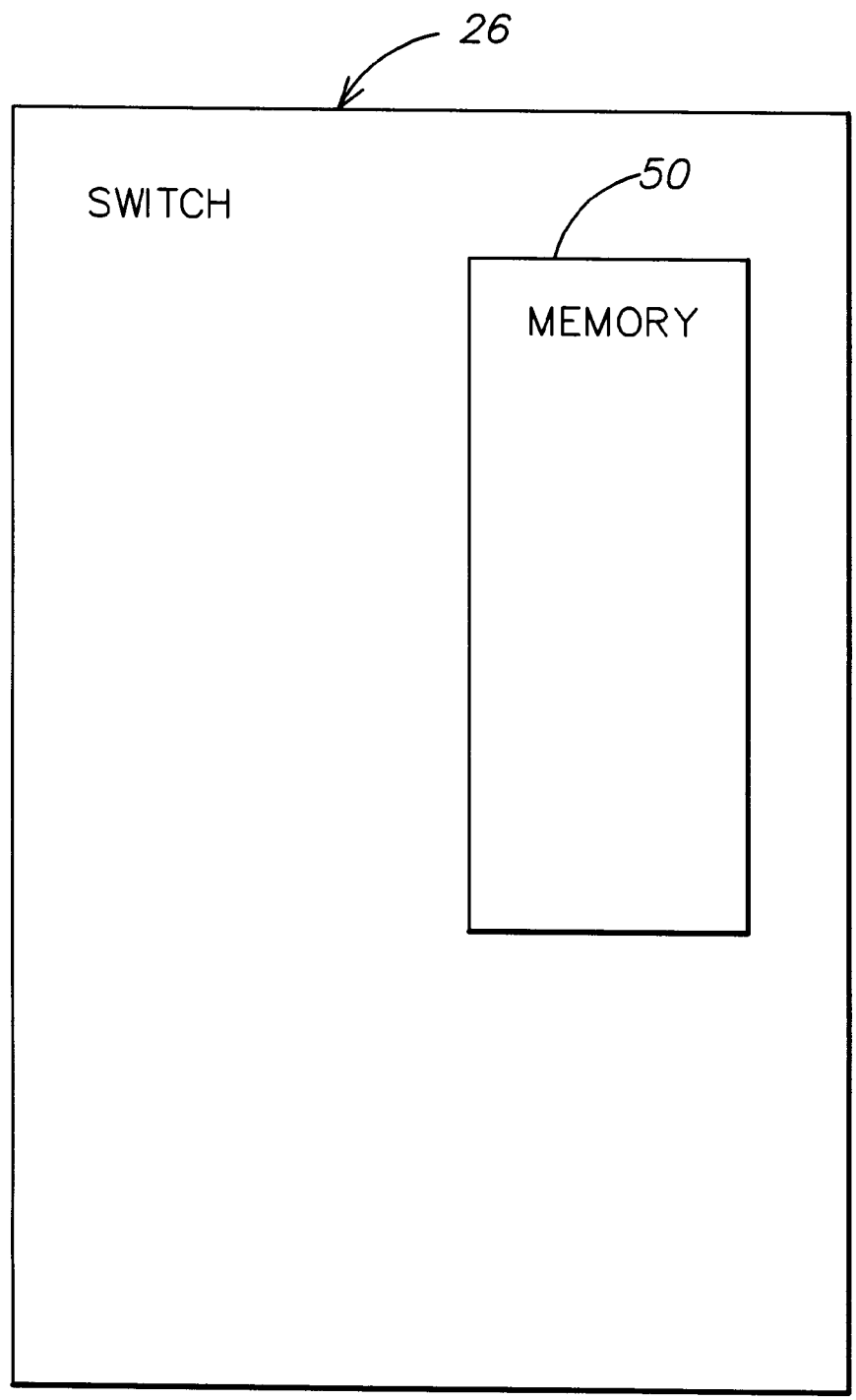
FIG. 2 is a block diagram of one of the switches of FIG. 1.

The decision and creation of any SVC occurs when cells arrive at a network resource such as one of the switches, 24, 26, 27, and 28, shown in FIG. 1. Referring now to FIG. 2, the switch 26 is shown in greater detail. The switch 26 is shown to include a memory 50. Residing within the memory 50 in the exemplary switch 26 is a program (not shown)

which determines, upon the arrival of cells, which connection to establish in order to facilitate the flow of the cells to the next network resource or end node. The program is known as routing software because it is responsible for routing the flow of cells. In the prior art, as described above, the routing software creates a new connection upon the arrival of a flow of cells. Each of these new connections which is established may be created at a rate of 10–50 per second.

In the present invention, these SVCs are not used. Instead, the present invention establishes a set of Permanent Virtual Circuits (PVCs) prior to the flow of any cells. In a preferred embodiment, the present invention establishes up to tens of connections for any endnode, i.e., source nodes and destination nodes, and up to several thousand connections between switches.

Referring again to FIG. 1, by way of example, the present invention stores the connection over line 34 between node 10 and switch 26 in a memory (not shown) of node 10. The connection over link 33 to switch 27, and the connection over link 32 to switch 28, are stored in the memory 50 of switch 26. The connection over line 38 between switch 27 and node 18 is stored in a memory (not shown) of switch 27, while connection over line 36 to node 18, the connection over lines 39 and 40 to node 20 and node 22, respectively, are stored in a memory (not shown) of the switch 28. Each of these stored connections are referred to as Permanent Virtual Circuits (PVCs). A PVC is usually an end-to-end (e.g., node 10 to node 18), while link address is a Virtual Channel Index. The present embodiment uses prebuilt, pre-allocated Virtual Channel Indices, links them togther at the switches, using the routing method to create an end-to-end connection dynamically and faster than the SVC signaling mechanism.

Figure 3:
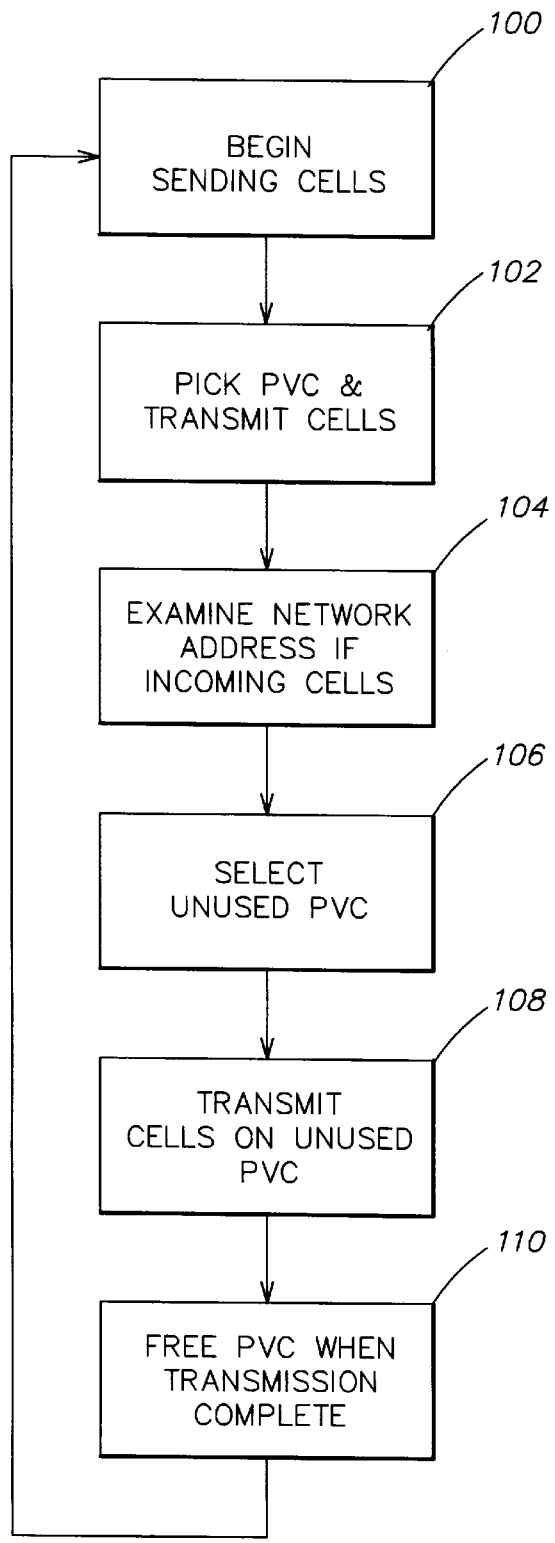
FIG. 3 is a flow chart illustrating the invention as it resides in the exemplary computer network of FIG. 1.

Referring now to FIG. 3, a flow chart illustrating the principles of the present invention is shown to begin at Step 100 where a node 10 is ready to begin transmitting cells without an ATM connection in place. At Step 102, the memory of node 10 checks its previously stored list of PVCs and selects one unused PVC to transmit its cells to switch 26. The unused PVCs are connected to the routing software at switch 26 (and all switches). Cells arrive at the memory 50 of switch 26. At Step 104, within the memory 50, routing software examines a network address contained in the first (incoming) cell to arrive in the switch 26 and at Step 106 picks one of the previously stored PVCs to establish an output to the next network resource or endstation. The unused PVC on the output link is selected at Step 106 and at Step 108 cells are transmitted to the next network resource or endstation using the PVC selected in Step 106. After all cells have been transmitted on the selected PVC, at Step 110 the process returns to Step 100, possibly freeing up the PVC if unused for a predetermined period of inactivity.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method for routing data cells between a plurality of nodes in a computer network, the method comprising the steps of:

providing each of the nodes with a node memory;

providing a plurality of network resources to connect each one of the plurality of nodes to one another, each of the network resources having a memory, each of the memories of the network resources having a stored routing method;

storing a plurality of predefined node connections in each of the memories of each of the nodes, each predefined node connection defining a connection to a network resource on a predefined path to another node;

storing a plurality of predefined network resource connections in each of the memories of each of the network resources, each predefined network resource connection defining a connection to another network resource on a predefined path to a node or a connection to another node;

selecting a first node, the first node having a plurality of data cells to transmit to a second node;

selecting, from the plurality of predefined node connections in a first node memory in the first node, a first node connection to a network resource on a predefined path to the second node;

transmitting, without modifying, the plurality of data cells on the selected first node connection to the first network resource;

receiving the plurality of data cells in the first network resource;

selecting, from the plurality of predefined network resource connections in a first network resource memory in the first network resource, a first network resource connection on a predefined path to the second node; and transmitting, without modifying, the data cells on the selected first network resource connection.

2. The method for routing data cells in a computer network according to claim 1 wherein the data cells are fixed length Asynchronous Transfer Mode (ATM) cells.

3. The method for routing data cells in a computer network according to claim 1 wherein the plurality of network resources are Asynchronous Transfer Mode (ATM) switches.

4. The method for routing data cells in a computer network according to claim 3 wherein the step of selecting the first resource connection comprises the steps of:

determining a destination address of the second node in a first data cell by a routing method contained in the memory of the first network resource; and selecting the first network connection according to the determined destination address.

5. A method for routing data cells from a source node to a destination node in a computer network, the computer network including a plurality of network resources, the method comprising the steps of:

storing data at a particular one of the network resources prior to sending asynchronous transfer mode (ATM) data cells from the source node to the particular network resource, the stored data representing a plurality of pre-allocated links connecting the particular network resource to at least one of another network resource in the network on a pre-allocated path to the destination node or connecting the particular network resource to the destination node;

receiving, at the particular network resource, ATM data cells transmitted by the source node;

selecting one of the pre-allocated links when the particular network resource receives the ATM data cells, the selected pre-allocated link being on a pre-allocated path leading to the destination node; and transmitting, without modifying, the received ATM data cells on the selected pre-allocated link.

6. The method of claim 5, further comprising the step of:

examining a network address of the destination node contained in one of the received ATM data cells to determine which of the stored pre-allocated links to select for transmitting the received ATM data cells.

7. The method of claim 5 wherein the link selected for transmitting the received ATM data cells is a currently unused pre-allocated link.

8. The method of claim 5, further comprising the step of:

freeing the selected pre-allocated link for subsequent use when the selected pre-allocated link is inactive for a predefined period.

9. The method of claim 5, further comprising the step of:

storing data at the source node prior to transmitting the ATM data cells from the source node, the data stored at the source node representing a plurality of pre-allocated links connecting the source node to at least one of the network resources of the network.

10. The method of claim 9, further comprising the step of:

selecting a particular one of the pre-allocated links connecting the source node to at least one of the network resources, the selected particular pre-allocated link leading to the particular network resource on the path to the destination node; and transmitting, without modifying, the ATM data cells on the particular selected pre-allocated link.

\* \* \* \* \*